R. H. NEWMAN.
FRUIT KNIFE.
APPLICATION FILED DEC. 9, 1918.
1,301,297.
Patented Apr. 22, 1919.
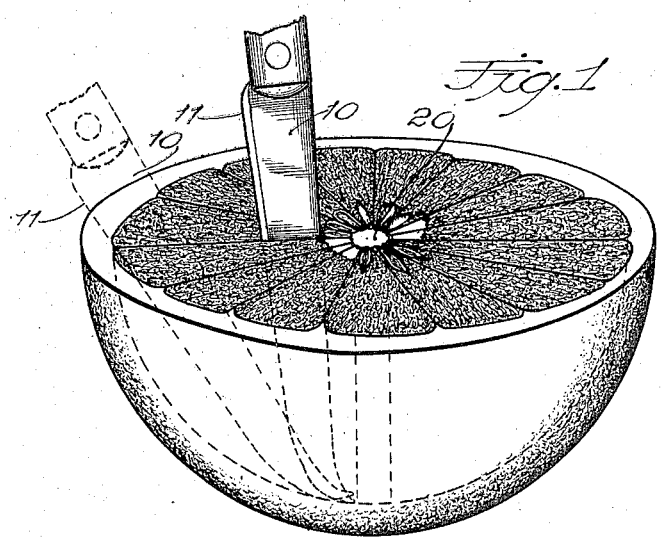
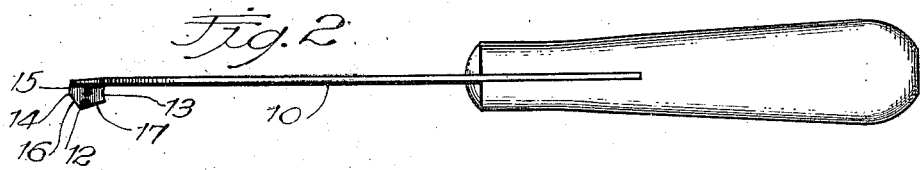
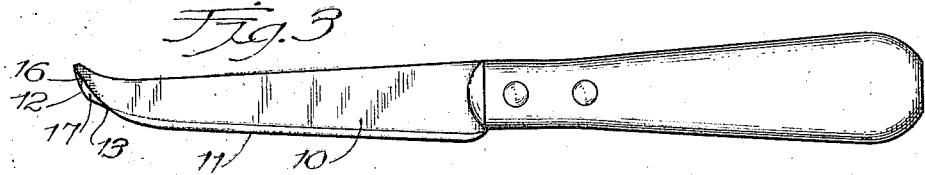
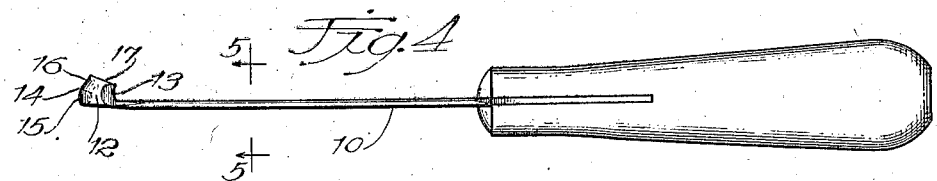
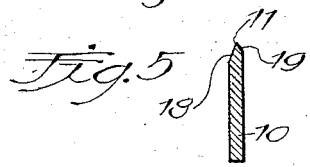
Witnesses:
Andrew Anderson
Mary A. Cook
Inventor
Rutledge H. Newman
Williams Bradbury & Lee
Attys.

UNITED STATES PATENT OFFICE.

RUTLEDGE H. NEWMAN, OF CHICAGO, ILLINOIS.

FRUIT-KNIFE.

1,301,297.

Specification of Letters Patent.

Patented Apr. 22, 1919.

Application filed December 9, 1918. Serial No. 265,837.

*To all whom it may concern:*

Be it known that I, RUTLEDGE H. NEWMAN, a citizen of the United States, residing at Chicago, in the county of Cook and State of Illinois, have invented a certain new and useful Improvement in Fruit-Knives, of which the following is a full, clear, concise, and exact description, reference being had to the accompanying drawings, forming a part of this specification.

My invention relates to improvements in fruit knives and is especially concerned with a knife for removing the non-edible portions comprising the partitions and cores of grapefruits, oranges, and other citrous fruits. The objects of my invention are to provide an improved form of knife having certain advantages over that disclosed in my Patent, No. 1,226,797, of May 22nd, 1917, and No. 1,261,954 of April 9th, 1918, and is particularly concerned with improvements on the knife disclosed in the last mentioned patent.

I have found that most people, in using the knife disclosed in the last mentioned patent for cutting the partition from the rind, are inclined to press the upper end of the knife blade against the partition to such an extent that the knife is inclined considerably from the perpendicular, and the side cutting edge, as well as the point formed by the side cutting edge, and the rear cutting edge cut into the rind, and thereby prevent the partition from being cut loose from the rind. The inclined rear edge of the knife also has a tendency to draw the cutting edge of the knife blade into contact with the partition in such a manner that the cutting blade cuts entirely through the partition and thus defeats the purpose for which the knife was intended. While the above defects in the operation of the knife disclosed by the patent referred to are largely due to a careless manipulation of the knife, it is the object of my present invention to provide a knife which will guard against, and to a great extent overcome the objections referred to. Another object of my present invention is to provide a knife of the character described which can also be used for removing the seeds from citrous fruits. I have found by experience that if it is attempted to use the cross blade of the knife disclosed in my patent last mentioned above, the point formed by the sharpened side edge and the rear cutting edge cuts through the partitions adjacent the seeds, and when it is withdrawn, severs a portion of the partition which remains in the fruit.

Other objects will appear as the description progresses, reference being had to the accompanying drawing, in which Figure 1 is a perspective view of one-half of a grapefruit or other citrous fruit showing in full lines the position in which the knife is first inserted in the fruit, and in dotted lines the position which the knife occupies relative to the fruit when severing the partition from the rind;

Fig. 2 is a plan view of the knife looking toward the back edge thereof;

Fig. 3 is a side elevation;

Fig. 4 is a bottom view of the knife looking toward the sharpened edge thereof; and Fig. 5 is a transverse section of the knife blade taken on line 5—5 of Fig. 4.

Similar characters of reference refer to similar parts throughout the several views.

Referring to the drawings, the reference character 10 indicates the blade of the knife which is similar in contour to an ordinary paring knife, the free end of the knife being provided with a curved cutting edge 11. Secured to the end of the curved cutting edge 11 and extending substantially at right angles to the plane of the blade is a cross blade 12 having the rear cutting edge 13. The front cutting edge of the knife is sharpened and is inclined rearwardly in both directions from a point 14 which is at substantially the center of the front cutting edge, thereby forming two cutting edges 15 and 16, respectively. The edge 15 is inclined to a less degree than the edge 16 and may extend at right angles to the plane of the blade without materially affecting the functioning of the knife. The side edge 17 of the cross blade is not sharpened, but is of substantially the same thickness as the end of the blade. This edge is slightly inclined from the point where it meets the cutting edge 16 to the point where it meets the rear cutting edge 13. As shown in Fig. 5, the cutting edge of the blade 10 of the knife is formed by two bevels 18 and 19, respectively, the bevel 18 being on the side of the blade opposite the cross blade and being a comparatively long bevel, and the bevel 19 being on the side of the blade adjacent the cross blade and much shorter than the bevel 18.

In operation my knife is inserted, as shown in full lines in Fig. 1, and then tipped to the position shown in dotted lines. By a forward movement of the knife the cutting edges 15 and 16 are caused to sever a portion of the core 20 of the fruit from the rind. In the knife disclosed in my Patent No. 1,261,954, above referred to, after the operation just described was performed the knife was given a slight lateral motion toward the partition and toward the edge of the fruit in order to force the point formed by the side and rear cutting edges through the partition. With my present knife, however, after the operation just described has been performed the knife is drawn slightly toward the edge of the fruit and then given a forward and lateral movement, whereby the cutting edge 16 cuts through the partition a sufficient distance to position the rear cutting edge of the cross blade at a point to sever the partition from the rind. The knife is then drawn toward the edge of the fruit, whereupon the rear cutting edge severs the partition from the rind. This operation severs one side of the partition from the adjacent fruit pulp. The knife is then again inserted adjacent the core but on the opposite side of the partition, and is then again drawn toward the outer edge of the rind to separate the partition from the adjacent fruit pulp.

It will be noted from an inspection of the drawings that the rear cutting edge of my improved fruit cutting knife extends at substantially right angles to the plane of the knife blade. This is to prevent the knife blade from being drawn into such position as to cut through the partition. I also prevent this last occurrence by giving the knife blade the short bevel 19 which tends to prevent the blade from cutting into the partition.

My improved knife can also be used for removing the seeds from the fruit by merely inserting the cross blade beneath the seeds in substantially the same position relative to the fruit as that shown in Fig. 1, except that the end of the knife will not be inserted as far into the fruit, but only sufficient to position the cross blade beneath the seeds. The blade is then twisted so as to turn the knife at an angle to the position shown in Fig. 1, to crowd the seed against the blade of the knife, whereupon by pulling the knife upwardly the cross blade will act as a scoop to remove the seed from the fruit. The omission of the sharp point formed by the side cutting edge and the rear cutting edge of the knife disclosed in my last mentioned patent facilitates the manipulation of the knife for removing seeds.

While I have described the details of the preferred embodiment of my invention, it is to be understood that my invention is capable of other adaptations and modifications within the scope of the appended claims.

Having thus described my invention, what I claim is:—

1. The combination with a knife blade, of a cross blade secured to the free end thereof and extending substantially perpendicular thereto, the forward edge of said cross blade being sharpened and inclined rearwardly from a point adjacent the center thereof, the rear edge of said cross blade being sharpened and the side edge thereof being blunted.

2. The combination with a knife blade, of a cross blade secured to the free end thereof and extending substantially perpendicular thereto, the front and rear edges of said cross blade being sharpened and the side edge thereof being blunted.

3. The combination with a knife blade, of a cross blade secured to the free end thereof and extending substantially perpendicular thereto, the forward end of said cross blade being sharpened and inclined rearwardly from a point adjacent the center thereof.

4. The combination with a knife blade, of a cross blade secured to the free end thereof and extending substantially perpendicular thereto, the front and rear edges of said cross blade being sharpened, the edge of said knife blade adjacent the rear cutting edge of said cross blade being beveled in opposite directions to form a cutting edge, the bevel on the side of said knife blade adjacent said cross blade being shorter than the bevel on the opposite side of said knife blade.

5. The combination with a knife blade, of a cross blade secured to the free end thereof, the rear edge of said cross blade being sharpened and the edge of said knife blade adjacent the rear edge of said cross blade being beveled to provide a cutting edge, the said bevel being on the side of said knife blade adjacent said cross blade and being comparatively short.

6. The combination with a knife blade, of a cross blade secured to the free end thereof and extending substantially perpendicular thereto, the rear edge of said cross blade being sharpened and the side edge thereof being blunted.

In witness whereof, I hereunto subscribe my name this 2nd day of December, 1918.

RUTLEDGE H. NEWMAN.

Witnesses:
 EDNA V. GUSTAFSON,
 M. FAE PETRIE.